United States Patent
Reynolds, III

(10) Patent No.: US 6,199,733 B1
(45) Date of Patent: Mar. 13, 2001

(54) MULTI-POSITION PIVOTING MOUNT SPEED SQUARE HOLDER

(76) Inventor: Green Reynolds, III, 1100 Pinebergen Rd., Pine Bluff, AR (US) 71603

( * ) Notice: Subject to any disclaimer, the term of this patent is extended or adjusted under 35 U.S.C. 154(b) by 0 days.

(21) Appl. No.: 09/515,484

(22) Filed: Feb. 29, 2000

(51) Int. Cl.[7] .................................................. A45F 5/00
(52) U.S. Cl. ...................... 224/269; 224/268; 224/667; 224/255; 224/904; 24/3.12; 24/376; 24/573.4; 24/599.8
(58) Field of Search .................................... 224/268, 269, 224/272, 904, 255; 24/3.11, 3.12, 375, 376, 573.3, 573.4, 599.8

(56) References Cited

U.S. PATENT DOCUMENTS

| 468,213 | * | 2/1892 | Violett | 24/599.8 X |
|---|---|---|---|---|
| 806,632 | * | 12/1905 | Breer | 24/3.11 |
| 947,764 | * | 1/1910 | Schartow | 24/375 |
| 1,212,511 | * | 1/1917 | Kropp | 24/3.12 X |
| 1,432,016 | * | 10/1922 | Crawford | 24/3.12 X |
| 3,285,482 | * | 11/1966 | Bedsaul, Sr. | 224/268 |
| 3,357,615 | * | 12/1967 | Hill | 224/268 X |
| 4,113,156 | * | 9/1978 | Brito | 224/269 X |
| 4,633,691 | * | 1/1987 | Hardy | 224/667 X |
| 4,819,847 | | 4/1989 | Anderson . | |
| 4,872,600 | | 10/1989 | Corbin . | |
| 5,016,796 | | 5/1991 | Johnson . | |
| 5,341,976 | | 8/1994 | Rider . | |
| 5,388,740 | | 2/1995 | Garland . | |
| 5,619,774 | * | 4/1997 | Perry | 24/3.12 X |
| 5,687,892 | | 11/1997 | Johns . | |
| 5,979,023 | * | 11/1999 | Nutto | 24/375 X |
| 5,983,686 | * | 11/1999 | Lee | 224/667 X |

* cited by examiner

Primary Examiner—Gregory M. Vidovich
(74) Attorney, Agent, or Firm—Henderson & Sturm LLP

(57) ABSTRACT

A speed square holder including an elongated vertically disposed body member having a top spring clip and a bottom spring clip offset and connected by an intermediate portion. A top mount is pivotally attached to the top spring clip and a bottom mount is pivotally attached to the bottom spring clip. Spring biased top and bottom lever buttons are pivotally attached to the intermediate portion and are disposed in contacting relationship with the respective top and bottom mounts. In use, the top spring clip is positioned over a tool belt or nail pocket with the top lever button in contact with the top edge of the belt or pocket. Downward pressure on the top spring clip forces the top button up and forces the pivoting top mount open to receive the edge of the belt or pocket. The speed square is then positioned over the bottom spring clip in contact with the bottom button. Downward pressure is applied to force the bottom button down and force the bottom pivot mount open to receive the square.

16 Claims, 2 Drawing Sheets

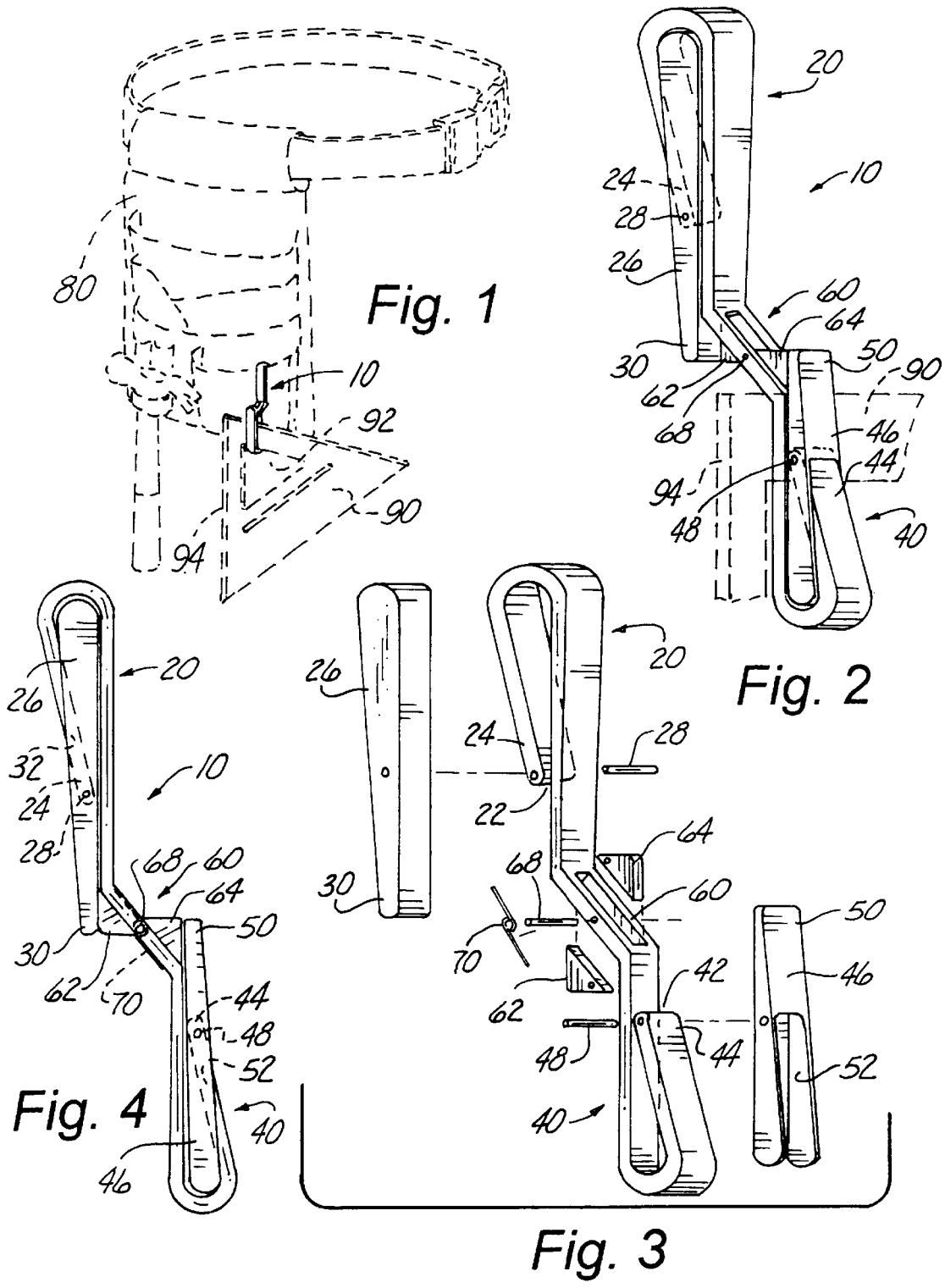

MULTI-POSITION PIVOTING MOUNT SPEED SQUARE HOLDER

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of tool holders, and more particularly to a speed square holder.

2. Description of Related Art

As can be seen by reference to the following U.S. Pat. Nos. 4,819,847; 4,872,600; 5,016,796; 5,341,976; 5,388,740 and 5,687,892, the prior art is replete with myriad and diverse tool holders.

While all of the aforementioned prior art constructions are more than adequate for the basic purpose and function for which they have been specifically designed, they are uniformly deficient with respect to their failure to provide a simple, efficient, and practical multi-position pivoting mount speed square holder.

As a consequence of the foregoing situation, there has existed a longstanding need for a new and improved speed square holder and the provision of such a construction is a stated objective of the present invention.

BRIEF SUMMARY OF THE INVENTION

Briefly stated, the present invention provides a speed square holder including an elongated vertically disposed body member having a top spring clip and a bottom spring clip offset and connected by an intermediate portion. A top mount is pivotally attached to the top spring clip and a bottom mount is pivotally attached to the bottom spring clip. Spring biased top and bottom lever buttons are pivotally attached to the intermediate portion and are disposed in contacting relationship with the respective top and bottom mounts. In use, the top spring clip is positioned over a tool belt or nail pocket with the top lever button in contact with the top edge of the belt or pocket. Downward pressure on the top spring clip forces the top button up and forces the pivoting top mount open to receive the edge of the belt or pocket. The speed square is then positioned over the bottom spring clip in contact with the bottom button. Downward pressure is applied to force the bottom button down and force the bottom pivot mount open to receive the square.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view showing the speed square holder of the present invention attached to a tool belt;

FIG. 2 is a perspective view of the speed square holder;

FIG. 3 is an exploded perspective view thereof;

FIG. 4 is a side elevational view thereof; and

DETAILED DESCRIPTION OF THE INVENTION

Figure 5:
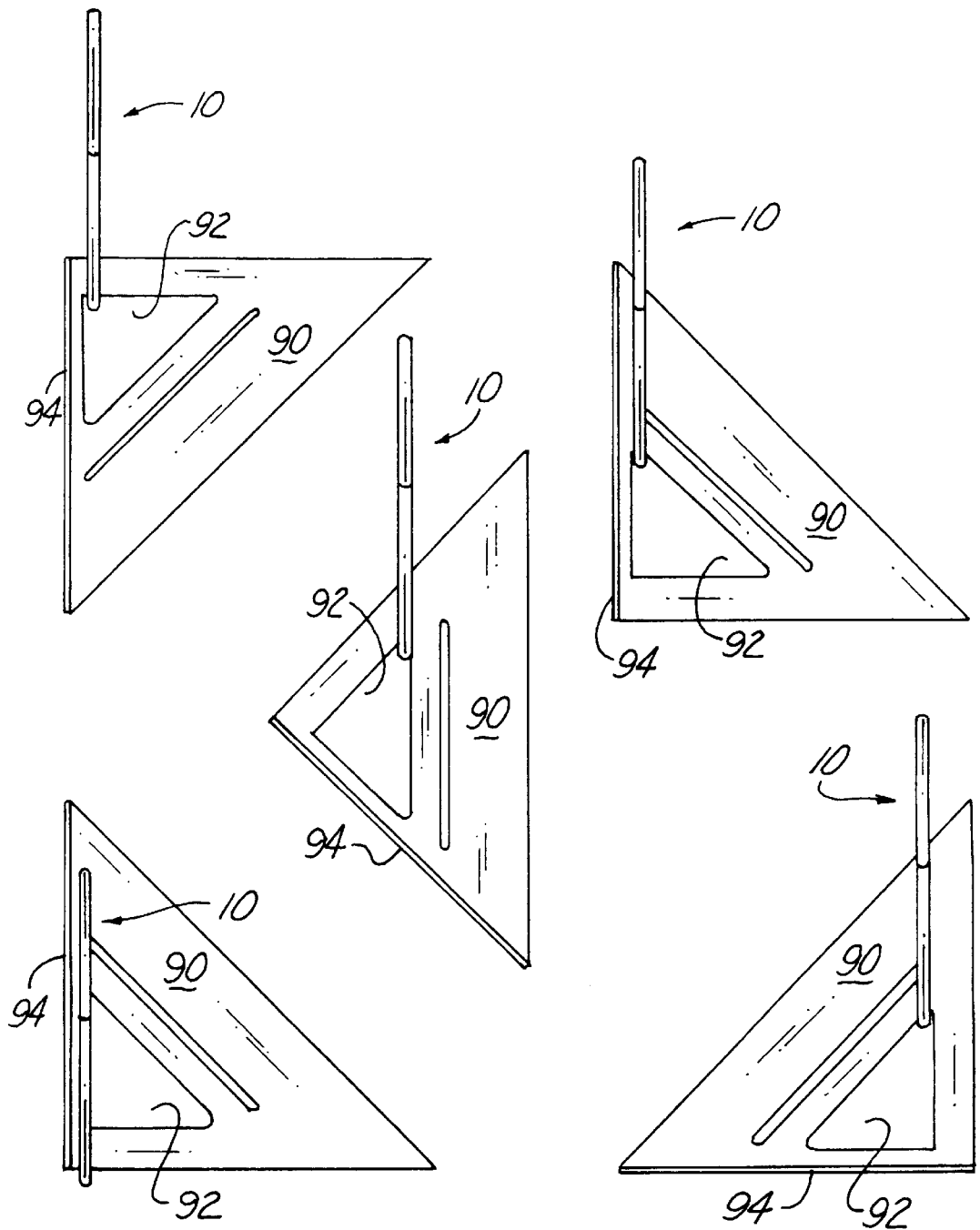
FIG. 5 is a series of side elevational views showing holders with attached speed squares in various possible orientations.

As can be seen by reference to the drawings, and in particularly to FIG. 1, the speed square holder that forms the basis of the present invention is designated generally by the reference number 10. The speed square holder 10 includes an elongated body member having a first top spring clip 20 and a second bottom spring clip 40 offset and interconnected by an intermediate section 60. The top spring clip 20 has a downwardly directed opening 22 at its free end 24. A first top mount 26 is pivotally attached to the free end by pin 28 such that the lower end 30 of the mount 26 extends down to the intermediate portion 60. A recessed area 32 is formed in the mount 26 to matingly receive a portion of the top spring clip 20.

The bottom spring clip 40 has an upwardly directed opening 42 at its free end 44. A second bottom mount 46 is pivotally attached by pin 48 so that the upper end 50 of the mount 46 extends up to the intermediate portion 60. A recessed area 52 in the mount 46 matingly receives a portion of the bottom spring clip 40.

Spring biased top and bottom lever buttons 62, 64 are pivotally attached by pin 68 to the intermediate section 60 in contact with the respective top and bottom mounts 26, 46. Spring 70 received on pivot pin 68 provides a downward biasing force on the top lever button 62 and an upward biasing force on the bottom lever button 64.

In use, the top spring clip 20 is attached to a tool belt 80 and the bottom spring clip 40 receives a speed square 90 which includes a central triangular opening 92 and a flanged edge 94. The top clip 20 is attached to the belt 80 by placing the holder 10 in a vertical position with the longer top spring clip 20 up. The top lever button 62 is placed over the top edge of the tool belt 80 and downward pressure is applied. The downward pressure forces the top lever button 62 up and forces the top pivoting mount 26 open to receive the edge of the belt 80. With the holder 10 secured to the belt 80, the speed square 90 is positioned with the hypotenuse in a vertical position, as illustrated in the central portion of FIG. 5. The upper inside corner of the central triangular opening 92 is then positioned above the bottom lever button 64 so that the outer portion of the bottom spring clip 40 extends through the opening 92. Downward pressure is then applied which forces the bottom lever button 64 down and forces the bottom pivoting mount 46 open to receive the square 90. The square 90 can be moved to any of the four positions shown in the upper-left, center and right-side of FIG. 5 without removing the square 90 from the holder 10. Alternatively, the square 90 may be mounted as shown in the lower-left of FIG. 5 by positioning the square 90 so the flanged edge 94 is vertical and the edge adjacent the flanged edge 94 is in contact with the bottom lever button 64. When downward pressure is applied, the bottom mount 46 is forced open to receive the square 90.

The speed square holder 10 is designed to hang from either side of the carpenter's or builder's leather nail and tool pouch 80. It will attach in several places on the pouch 80 and hold the speed square 90 firmly in one of several positions until ready for use. The holder 10 may be constructed of aluminum or other suitable materials, and be contoured to fit comfortably by the user's side. The holder 10 eliminates the need to remove the speed square 90 from the nail pocket when retrieving nails and eliminates the risk of the speed square 90 falling from the user's belt.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A speed square holder, comprising:

an elongated vertically disposed body member including a top portion forming a first spring clip with a downwardly directed opening at a first free end, a bottom portion forming a second spring clip with an upwardly directed opening at a second free end, and an intermediate portion attached to and interconnecting the top portion and the bottom portion such that the top portion is horizontally offset from the bottom portion;

a first mount pivotally attached at the first free end, the first mount having a lower end extending down to the intermediate portion;

a second mount pivotally attached at the second free end, the second mount having an upper end extending up to the intermediate portion;

a first lever button pivotally attached at a pivot point on the intermediate portion, the first lever button being disposed to contact the lower end of the first mount; and a second lever button pivotally attached at the pivot point on the intermediate portion, the second lever button being disposed to contact the upper end of the second mount.

2. The speed square holder of claim 1 wherein the first lever button is downwardly biased.

3. The speed square holder of claim 1 wherein the second lever button is upwardly biased.

4. The speed square holder of claim 2 wherein the second lever button is upwardly biased.

5. The speed square holder of claim 1 wherein the first mount includes a first recessed area disposed to matingly receive a portion of the first spring clip.

6. The speed square holder of claim 2 wherein the first mount includes a first recessed area disposed to matingly receive a portion of the first spring clip.

7. The speed square holder of claim 3 wherein the first mount includes a first recessed area disposed to matingly receive a portion of the first spring clip.

8. The speed square holder of claim 4 wherein the first mount includes a first recessed area disposed to matingly receive a portion of the first spring clip.

9. The speed square holder of claim 1 wherein the second mount includes a second recessed area disposed to matingly receive a portion of the second spring clip.

10. The speed square holder of claim 2 wherein the second mount includes a second recessed area disposed to matingly receive a portion of the second spring clip.

11. The speed square holder of claim 3 wherein the second mount includes a second recessed area disposed to matingly receive a portion of the second spring clip.

12. The speed square holder of claim 4 wherein the second mount includes a second recessed area disposed to matingly receive a portion of the second spring clip.

13. The speed square holder of claim 5 wherein the second mount includes a second recessed area disposed to matingly receive a portion of the second spring clip.

14. The speed square holder of claim 6 wherein the second mount includes a second recessed area disposed to matingly receive a portion of the second spring clip.

15. The speed square holder of claim 7 wherein the second mount includes a second recessed area disposed to matingly receive a portion of the second spring clip.

16. The speed square holder of claim 8 wherein the second mount includes a second recessed area disposed to matingly receive a portion of the second spring clip.

\* \* \* \* \*